United States Patent
Shinoda et al.

(10) Patent No.: US 8,711,529 B2
(45) Date of Patent: Apr. 29, 2014

(54) SWITCHING APPARATUS AND CONTROLLING METHOD THEREOF

(75) Inventors: Akihiro Shinoda, Niiza (JP); Kiyokatsu Satoh, Niiza (JP); Hiroaki Kawaguchi, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 474 days.

(21) Appl. No.: 13/121,958

(22) PCT Filed: Mar. 24, 2010

(86) PCT No.: PCT/JP2010/055112
§ 371 (c)(1),
(2), (4) Date: Mar. 31, 2011

(87) PCT Pub. No.: WO2010/122870
PCT Pub. Date: Oct. 28, 2010

(65) Prior Publication Data
US 2011/0176249 A1   Jul. 21, 2011

(30) Foreign Application Priority Data
Apr. 24, 2009  (JP) .................. 2009-106464

(51) Int. Cl.
*H02H 3/00*  (2006.01)
(52) U.S. Cl.
USPC .......................................... 361/18

(58) Field of Classification Search
USPC .......................................... 361/18
See application file for complete search history.

(56) References Cited

U.S. PATENT DOCUMENTS 5,818,670 A * 10/1998  Ahn .......................... 361/18
7,345,894 B2 * 3/2008  Sawtell et al. ............ 363/21.11

FOREIGN PATENT DOCUMENTS

| JP | 2 176901 | 7/1990 |
| JP | 2000 114039 | 4/2000 |
| JP | 2004 22947 | 1/2004 |
| JP | 2008 304041 | 12/2008 |

OTHER PUBLICATIONS

International Search Report issued Jun. 8, 2010 in PCT/JP10/055112 filed Mar. 24, 2010.

* cited by examiner

*Primary Examiner* — Stephen W Jackson
(74) *Attorney, Agent, or Firm* — Oblon, Spivak, McClelland, Maier & Neustadt, L.L.P.

(57) ABSTRACT

A switching apparatus includes a DC voltage output unit, a switching element to supply the DC voltage to a load, a power detection unit to detect power supplied from the switching element to the load, a drive unit to control the switching element in PWM manner according to an output from the power detection unit, and a stop unit to stop the PWM control if a value of the DC voltage is lower than a first threshold value. The first threshold value is lower than a minimum operation voltage value of the power detection unit.

5 Claims, 4 Drawing Sheets

SWITCHING APPARATUS AND CONTROLLING METHOD THEREOF

TECHNICAL FIELD

The present invention relates to a switching apparatus, and particularly, to a switching apparatus provided with an UVLO (Undervoltage Lockout) function and a controlling method of the same.

BACKGROUND TECHNOLOGY

Japanese Unexamined Patent Application Publication No. 2000-114039 discloses a switching apparatus that is a solenoid driving apparatus configured to detect a load current passing through a solenoid serving as load and to control a switching element in PWM manner so as to minimize a deviation of the load current from a control target value supplied from a microcontroller.

Japanese Unexamined Patent Application Publication No. 2004-22947 discloses a function of stopping operation of a control circuit if a power source voltage supplied to the control circuit becomes lower than a predetermined value, thereby preventing a malfunction of the control circuit in a switching apparatus. The function is called UVLO (Undervoltage Lockout) and is known to be included in the above-mentioned solenoid driving apparatus.

With reference to FIGS. 1 and 2, operation of the UVLO function in the switching apparatus according to the related art will be explained. FIGS. 1 and 2 are flowchart and waveform diagram illustrating operation of the switching apparatus according to the related art. VB' is a power source voltage supplied to the control circuit, Vth' is the predetermined value to stop the control circuit, Vamin' is a minimum operation voltage of the control circuit, IL' is a load current passing through the solenoid, and VG' is a gate drive signal to control ON/OFF of the switching element.

In step S101, the switching apparatus carries out a normal operation. When the DC voltage VB' rises, the control circuit supplies power to the solenoid by controlling the switching element in the PWM manner with the gate drive signal VG' that is a pulse signal alternating H (high) level and L (low) level. When the gate drive signal VG' is at H-level, the switching element establishes an ON state. In response to the operation of the switching element, the load current IL' increases and decreases.

In step S102, the control circuit checks to see if the power source voltage VB' is lower than the predetermined value Vth'. If the power source voltage VB' is equal to or higher than the predetermined value Vth', the switching apparatus continues the normal operation in step S101. If the power source voltage VB' is lower than the predetermined value Vth', the control circuit stops in step S103.

Namely, at time t1' illustrated in FIG. 2, an operating state of a peripheral device (not illustrated) causes the DC voltage VB' to become lower than the predetermined value Vth' and the control circuit stops the switching element by setting the gate drive signal VG' at L-level.

In step S104, the control circuit checks to see if the power source voltage VB' is equal to or higher than the predetermined value Vth'. If the power source voltage VB' is equal to or higher than the predetermined value Vth', the control circuit restarts the switching element in step S105. If the power source voltage VB' is lower than the predetermined value Vth', the control circuit continuously makes the switching element inoperative in step S103.

Namely, in the period from time t1' to time t2' illustrated in FIG. 2 in which the DC voltage VB' is lower than the predetermined value Vth', the control circuit keeps stopping the switching element by maintaining the gate drive signal VG' at L-level. Thereafter, at time t2', the DC voltage VB' becomes higher than the predetermined value Vth' and the control circuit restarts the PWM control of the switching element by outputting the gate drive signal VG'. When the switching element restarts, the load current IL' starts to increase and decrease.

In step S106, the switching apparatus carries out the normal operation, like in step S101.

The switching apparatus with UVLO function according to the related art repeats the above-mentioned operation, thereby preventing a malfunction of the control circuit when the DC voltage VB' drops.

SUMMARY OF INVENTION

Elements that constitute the control circuit have individual minimum operation voltages (lower limit voltage values for normal operation). The predetermined value Vth' for stopping the control circuit is set according to a highest one among the minimum operation voltages of the elements. For example, the predetermined value Vth' of the switching apparatus of the related art is set to be higher than the minimum operation voltage value of an amplifier to detect the load current IL.

Namely, the switching apparatus with UVLO function according to the related art sets the predetermined value Vth' at a relatively high value, to raise a problem to narrow a voltage range in which the solenoid is controlled.

With regard to the above-mentioned problem, the present invention provides a switching apparatus with UVLO function, capable of operating in a wider voltage range.

According to a technical aspect of the present invention, the switching apparatus includes a DC voltage output unit to output a DC voltage, a switching element to supply the DC voltage to a load, a power detection unit to detect power supplied from the switching element to the load, a drive unit to PWM-control the switching element according to an output from the power detection unit, and a stop unit to stop the PWM control if a value of the DC voltage is smaller than a first threshold value. The switching apparatus is characterized in that the first threshold value is smaller than a minimum operation voltage value of the power detection unit.

According to another technical aspect of the present invention, there is provided a control method of a switching apparatus that PWM-controls a switching element and supplies a DC voltage to a load. The method is characterized in that the method PWM-controls the switching element according to an output from a power detection unit that detects power supplied from the switching element to the load, and if a value of the DC voltage is smaller than a minimum operation voltage value of the power detection unit, stops the PWM control.

MODE OF IMPLEMENTING INVENTION

With reference to the drawings, an embodiment of the present invention will be explained. Through the drawings, the same or like parts are represented with the same or like reference marks. The drawings illustrate typical models.

Figure 1:
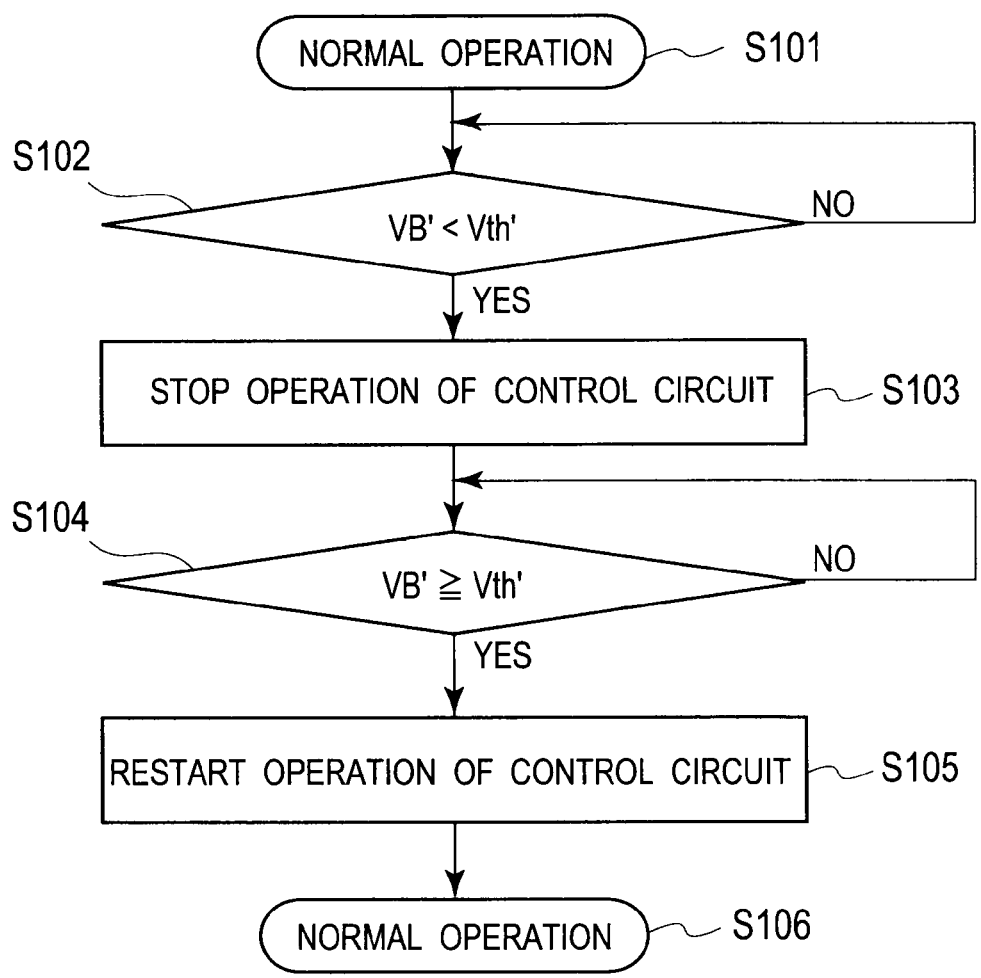
FIG. 1 is a flowchart illustrating operation of a switching apparatus according to a related art.
Figure 2:
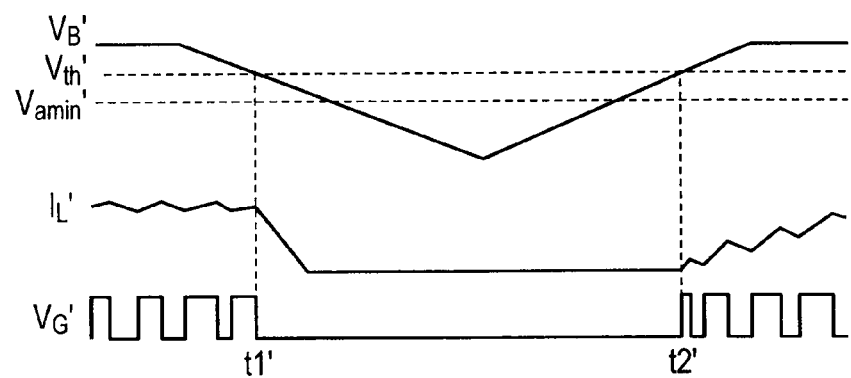
FIG. 2 is a waveform diagram illustrating operation of each part of the switching apparatus according to the related art.
Figure 3:
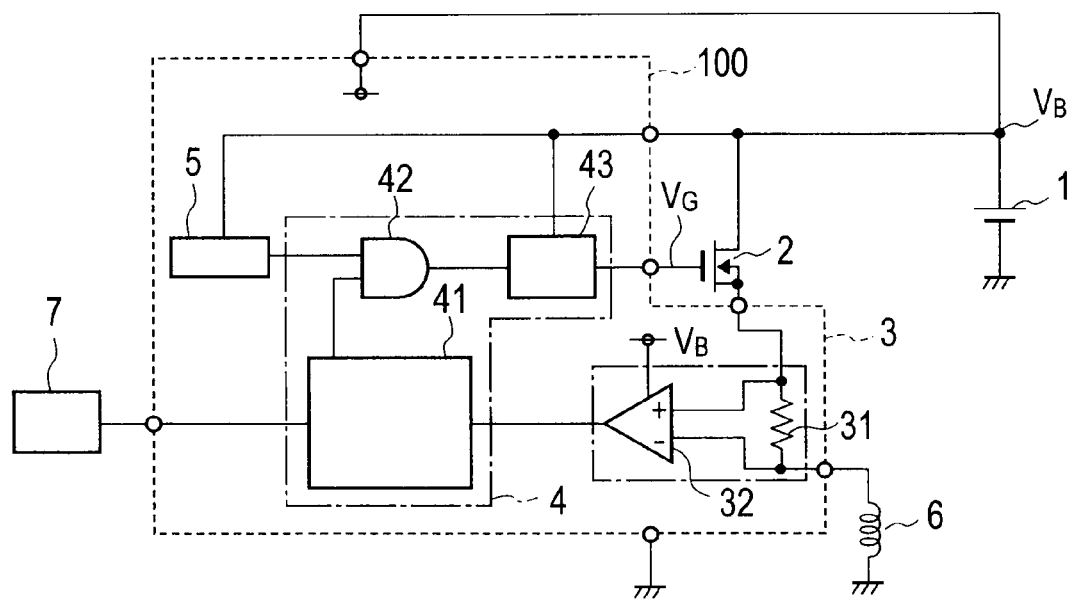
FIG. 3 is a circuit diagram illustrating a configuration of a switching apparatus according to an embodiment of the present invention.

With reference to FIG. 3, a configuration of a switching apparatus according to an embodiment of the present invention will be explained. The switching apparatus 1 according to the embodiment illustrated in FIG. 3 includes a battery 1 serving as a DC voltage output unit to supply power to a control circuit and other load, a switching element 2 to open and close a path between the battery 1 and a solenoid (load) 6, a current detection unit (power detection unit) 3 to detect a current passing through the solenoid 6, a drive unit 4 to control the switching element 2 in the PWM manner according to an output from the current detection unit 3 and a control target value from a microcontroller 7, and a stop unit 5 to detect a decrease in a DC voltage VB and stop the PWM control by the drive unit 4. The current detection unit 3, drive unit 4, and stop unit 5 constitute the control circuit 100.

The battery 1 is a rechargeable battery to output the DC voltage VB to a drain terminal of the switching element 2 and the control circuit 100. Instead of the battery 1, a circuit to rectify a commercial power source and output a DC voltage is adoptable.

The switching element 2 is a MOSFET with the drain terminal thereof connected to the battery 1. In response to a gate drive signal VG that is a pulse signal supplied from the control circuit 100 to a gate terminal of the MOSFET, the MOSFET intermittently outputs the DC voltage VB from a source terminal thereof to the current detection unit 3 and to the solenoid 6. The switching element 2 may be a bipolar transistor, an IGBT (insulated gate bipolar transistor), or the like.

The current detection unit 3 has a current detection resistor 31 and a current detection amplifier 32. A first end of the current detection resistor 31 is connected to the source terminal of the switching element 2 and a second end thereof is connected to a first end of the solenoid 6 serving as a load. The current detection resistor 31 detects a load current IL passing through the solenoid 6 and outputs voltage signals to input terminals of the current detection amplifier 32. The current detection amplifier 32 is driven with the DC voltage VB, to amplify voltage signals inputted through the inverting and non-inverting input terminals thereof and output a detection signal to the drive unit 4. The current detection amplifier 32 has a minimum operation voltage Vamin, and when the DC voltage VB exceeds Vamin, normally detects the load current IL.

The drive unit 4 has an operation circuit 41, an AND gate 42, and a driver circuit 43. The operation circuit 41 synchronizes with a clock signal supplied from the microcontroller 7, calculates a duty ratio (ON width) of the gate drive signal, i.e., a pulse signal according to the detection signal supplied from the current detection unit 3 and the control target value supplied from the microcontroller 7, and outputs a PWM signal based on a result of the calculation to a first input terminal of the AND gate 42. A second input terminal of the AND gate 42 is connected to the stop unit 5 and an output terminal thereof is connected to the driver circuit 43. The driver circuit receives a voltage stepped up from the DC voltage VB from a charge pump circuit (not illustrated) and outputs an output from the AND circuit 42 as the gate driver signal VG to the gate terminal of the switching element 2.

The operation circuit 41 has a threshold value Vth2 (second threshold value) higher than the minimum operation voltage Vamin of the current detection amplifier 32 and includes a sample-and-hold unit (not illustrated) operating according to a result of comparison between the DC voltage VB and the threshold value Vth2. If the DC voltage VB is higher than the threshold value Vth2, the sample-and-hold unit synchronizes with the clock signal supplied from the microcontroller 7 to periodically reset and hold duty information (calculation result) and output the PWM signal based on the held duty information to the AND gate 42. If the DC voltage VB is lower than the threshold value Vth2, the sample-and-hold unit holds duty information sampled just before the DC voltage VB becomes lower than the threshold value Vth2 and suspends the repetition of reset and hold. Namely, if a relationship of Vth2>VB is satisfied, the operation circuit 41 outputs a PWM signal of a constant duty ratio to the AND gate 42.

The stop unit 5 has a threshold value Vth1 (first threshold value), divides the DC voltage VB supplied from the battery 1, compares the divided voltage with the threshold value Vth1, and outputs a result of the comparison as a stop signal to the second input terminal of the AND gate 42. The stop unit 5 illustrated in FIG. 3 outputs a stop signal of H (high) level if the DC voltage VB is above the threshold value Vth1 and a stop signal of L (low) level if the DC voltage VB is below the threshold value Vth1. The threshold value Vth1 is set to be lower than the minimum operation voltage Vamin of the current detection amplifier 32 and higher than minimum operation voltages of elements, except the current detection amplifier 32, that constitute the control circuit 100.

The solenoid 6 has the first end connected to the second end of the current detection resistor 31 and a second end connected to the ground. The solenoid 6 is an actuator to provide a predetermined displacement according to the magnitude of the load current IL. In parallel with the solenoid 6, a regenerative diode (not illustrated) is connected.

The microcontroller 7 outputs the control target value and control clock signal to the drive unit 4.

Figure 4:
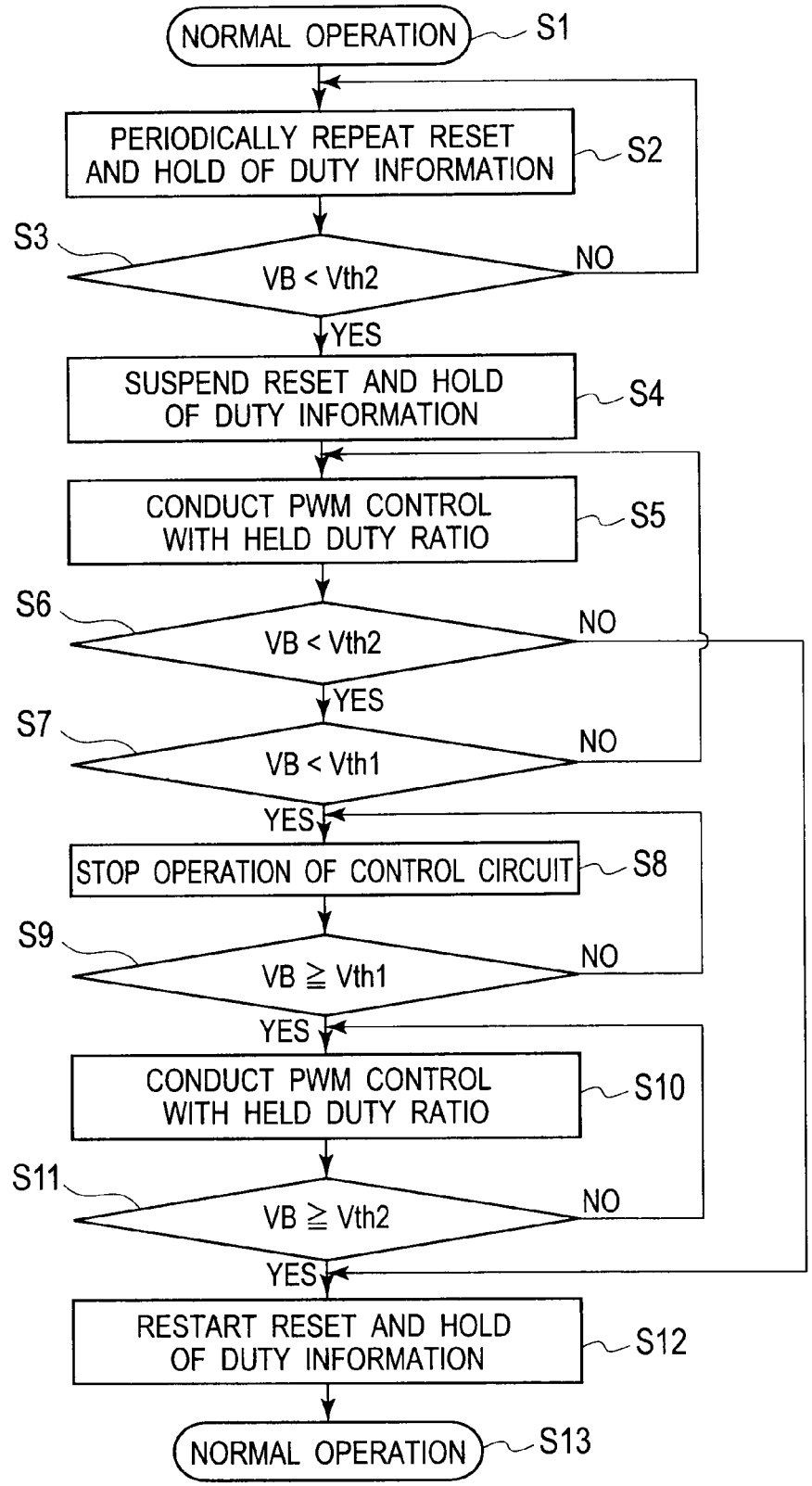
FIG. 4 is a flowchart illustrating operation of the switching apparatus according to the embodiment of the present invention.
Figure 5:
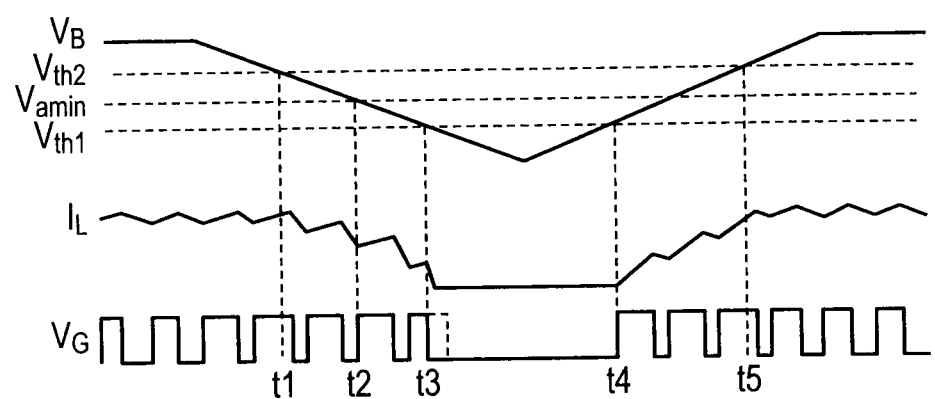
FIG. 5 is a waveform diagram illustrating operation of each part of the switching apparatus according to the embodiment of the present invention.

With reference to FIGS. 4 and 5, operation of the switching apparatus according to the embodiment will be explained.

FIGS. 4 and 5 are flowchart and waveform diagram illustrating operation of the switching apparatus according to the present invention illustrated in FIG. 3.

In step S1, the switching apparatus carries out a normal operation. When the DC voltage VB rises, the drive unit 4 in the normal operation supplies power to the solenoid 6 by starting the PWM control of the switching element 2 by outputting the gate drive signal VG, i.e., a pulse signal alternating at H (high) level and L (low) level. In response to the operation of the switching element, the load current IL increases and decreases.

In step S2, the operation circuit 41 brings a detection signal from the current detection unit 3 closer to a control target value from the microcontroller 7 by calculating a duty ratio (ON width), conducting the sample-and-hold function of periodically repeating the reset and hold of duty information, and outputting a PWM signal based on the held duty information to the AND gate 42.

In step S3, the control circuit 100 checks to see if the power source voltage VB is lower than the threshold value Vth2. If the power source voltage VB is equal to or higher than the threshold value Vth2, step S2 is carried out so that the switching apparatus conducts the normal operation and the operation circuit 41 periodically repeats the reset and hold of duty information with the sample-and-hold unit. If the power source voltage VB is lower than the threshold value Vth2, step S4 is carried out so that the operation circuit 41 suspends the reset and hold of duty information by the sample-and-hold unit. In step S5, the control circuit 100 uses a duty ratio held just before the DC voltage VB becomes lower than the threshold value Vth2, to control the switching element 2 in the PWM manner.

Namely, at time t1 illustrated in FIG. 5, the operating condition of a peripheral device (not illustrated) causes the DC voltage VB to decrease lower than the threshold value Vth2 and the operation circuit 41 suspends the repetition of reset and hold of duty information. Accordingly, the duty ratio of the gate drive signal VG is equalized to the duty ratio held just before time t1 when the DC voltage VB decreases lower than the threshold value Vth2.

In step S6, the control circuit 100 checks to see if the power source voltage VB is lower than the threshold value Vth2. If the power source voltage VB is equal to or higher than the threshold value Vth2, step S12 is carried out so that the operation circuit 41 conducts the sample-and-hold function to restart the reset and hold of duty information, and in step S13, the switching apparatus carries out the normal operation. If the power source voltage VB is lower than the threshold value Vth2, the control circuit 100 continuously controls the switching element 2 in a manner of the PWM at the duty ratio held just before the DC voltage VB becomes lower than the threshold value Vth2, and in step S7, the stop unit 5 checks to see if the power source voltage VB is lower than the threshold value Vth1.

In a case where, in step S7, the power source voltage VB is equal to or higher than the threshold value Vth1, the control circuit 100 continuously controls, in step S5, the switching element 2 in the PWM manner at the duty ratio held just before the DC voltage VB becomes lower than the threshold value Vth2. On the other hand, if the power source voltage VB is lower than the threshold value Vth1, the control circuit 100 uses, in step S8, the stop unit 5 to stop the PWM control of the switching element 2.

From time t1, the DC voltage VB further decreases, and at time t2 illustrated in FIG. 5, becomes lower than the minimum operation voltage Vamin of the current detection amplifier 32. Then, the current detection amplifier 32 is unable to normally detect the load current IL. At this time, the DC voltage VB is higher than the threshold value Vth1, and therefore, the control circuit 100 continuously controls the switching element 2 in the PWM manner at the constant duty ratio.

Namely, in the period from time t1 to time t3 illustrated in FIG. 5, the control circuit 100 depends not on an output from the current detection amplifier 32 but on the duty information held by the sample-and-hold function just before time t1, to generate the gate drive signal VG to control the switching element 2 in a manner of the PWM.

The DC voltage VB further decreases from time t2, and at time t3 illustrated in FIG. 5, decreases below the threshold value Vth1. Then, the stop unit 5 outputs a stop signal of L (low) level. During the period from time t3 to time t4, an output from the AND gate 42 becomes L-level without regard to an output from the operation circuit 41, and therefore, the drive signal VG outputted from the driver circuit 43 becomes L-level. Consequently, the control circuit 100 stops the PWM control of the switching element 2.

In step S9, the control circuit 100 checks to see if the power source voltage VB is equal to or higher than the threshold value Vth1. If the power source voltage VB is equal to or higher than the threshold value Vth1, the output from the stop unit 5 becomes H (high) level. In step S10, the control circuit 100 performs the PWM control of the switching element 2 in a similar manner to step S5 at the duty ratio held just before the DC voltage VB becomes lower than the threshold value Vth2. On the other hand, if the power source voltage VB is lower than the threshold value Vth1, the control circuit 100 makes the switching element 2 inoperative and maintains it in step S8.

Namely, in the period from time t3 to time t4 illustrated in FIG. 5, i.e., in the period in which the DC voltage VB is lower than the threshold value Vth1, the control circuit 100 makes the stop unit 5 maintain the operation stoppage of the switching element 2 by keeping the gate drive signal VG at L-level.

At time t4 illustrated in FIG. 5, the DC voltage VB increases to exceed the threshold value Vth1. Then, the stop unit 5 outputs a stop signal of H (high) level. As a result, the drive unit 4 outputs the gate drive signal VG based on a PWM signal from the operation circuit 41, to restart the PWM control of the switching element 2. At this time, the operation circuit 41 is suspending the repetition of reset and hold of duty information, and therefore, the outputted PWM signal is based on the duty information held by the sample-and-hold function just before time t1.

In step S11, the control circuit 100 checks to see if the power source voltage VB is equal to or higher than the threshold value Vth2. If the power source voltage VB is equal to or higher than the threshold value Vth2, the operation circuit 41 restarts, in step S12, the repetition of reset and hold of duty information by the sample-and-hold function. On the other hand, if the power source voltage VB is lower than the threshold value Vth2, the control circuit 100 continuously controls the switching element 2 in the PWM manner in step S10 at the duty ratio held just before the DC voltage VB becomes lower than the threshold value Vth2.

Namely, at time t5 illustrated in FIG. 5, the DC voltage VB increases higher than that of time t4 and exceeds the threshold value Vth2. Then, the operation circuit 41 restarts, as the normal operation, the repetition of reset and hold of duty information by the sample-and-hold function. As a result, the drive unit 4 performs the PWM control of the switching element 2 in a similar manner to that before time t1 according to a detection signal from the current detection unit 3 and a control target value from the microcontroller 7.

In step S13, the switching apparatus carries out the normal operation similar to step S1. The switching apparatus according to this embodiment of the present invention repeats such operation to continuously control the switching element 2 in the PWM manner and drive the solenoid 6 even during the period in which the DC voltage VB becomes lower than the minimum operation voltage Vamin of the current detection amplifier 32 to destabilize the operation of the current detection unit 3.

The switching apparatus according to this embodiment has below-mentioned effects.

(i) The threshold value Vth1 for the inoperative state of the switching element 2 is set to be lower than the minimum operation voltage Vamin of the current detection amplifier 32. This widens a voltage range in which the switching apparatus with UVLO (Undervoltage Lockout) function can operate to a lower voltage side.

(ii) When the DC voltage VB is equal to or lower than the threshold value Vth2, the drive unit 4 drives the switching element 2 in the PWM manner at a duty ratio (ON width) equal to that held just before the DC voltage VB becomes lower than the threshold value Vth2. The threshold value Vth2 is set to be higher than the minimum operation voltage Vamin of the current detection amplifier 32, and therefore, a sharp increase or decrease in the load current IL due to an erroneous operation or the like of the current detection amplifier 32 hardly occurs, and therefore, the solenoid 6 is properly driven.

(iii) When the control circuit 100 restarts, the switching element 2 is controlled in the PWM manner at the held duty ratio. Compared with restarting the PWM control at a minimum duty ratio, the load current IL quickly rises.

(iv) When the control circuit 100 restarts, the switching element 2 is controlled in the PWM manner at the held duty ratio. Compared with restarting the PWM control at a maximum duty ratio, the solenoid 6 is prevented from being broken with an overcurrent.

Although the present invention has exemplary been explained according to an embodiment of the present invention, the present invention is not limited to such a specific embodiment, and within the scope of the present invention mentioned in the claims, allows various modifications and alterations. For example, the present invention is applicable to switching apparatuses working for not only solenoids but also motors, LEDs, and lamps and to switching apparatuses for detecting and controlling load voltages. As a means to perform the PWM control of the switching element 2 at a given duty ratio (ON width), it is possible to continue the repetition of reset and hold of duty information and hold a control target value from the microcontroller 7 and a detection signal from the current detection unit 3. As a means to make the PWM control inoperative by way of the control circuit 100, the driver circuit 43 may be stopped with a stop signal from the stop unit 5, or a path between the switching element 2 and the driver circuit 43 may be opened according to the stop signal.

EFFECT OF INVENTION

As mentioned above, the present invention provides the switching apparatus with UVLO function capable of operating in a wider voltage range.
(United States Designation)
In connection with United States designation, this international patent application claims the benefit of priority under 35 U.S.C. 119(a) to Japanese Patent Application No. 2009-106464 filed on Apr. 24, 2009, the entire content of which is incorporated by reference herein.

The invention claimed is:

1. A switching apparatus comprising:
   a DC voltage output unit to output a DC voltage;
   a switching element supplying the DC voltage to a load;
   a power detection unit detecting power supplied from the switching element to the load;
   a driver configured to control the switching element in a manner of PWM according to an output from the power detection unit; and
   a stop unit configured to stop the PWM control if a value of the DC voltage is lower than a first threshold value, wherein
   the first threshold value is lower than a minimum operation voltage value of the power detection unit
   wherein
   the apparatus has a second threshold value higher than the minimum operation voltage value of the power detection unit, and
   if the value of the DC voltage is lower than the second threshold value, the driver controls the switching element at a constant duty ratio.

2. The switching apparatus as set forth in claim 1, wherein the driver periodically holds and resets a duty ratio for controlling the switching element in the PWM manner, and
   if the value of the DC voltage is lower than the second threshold value, the driver controls the switching element at a duty ratio held in the drive unit.

3. The switching apparatus as set forth in claim 1, wherein the load is a solenoid that provides a predetermined displacement according to a supplied current.

4. The switching apparatus as set forth in claim 3, wherein the power detection unit detects the current supplied to the load.

5. The switching apparatus as set forth in claim 1, wherein the DC voltage output unit is a battery.

* * * * *